I. E. BRANDRICK.
COFFEE GRINDER.
APPLICATION FILED MAY 28, 1909.
934,590.
Patented Sept. 21, 1909.
2 SHEETS—SHEET 1.
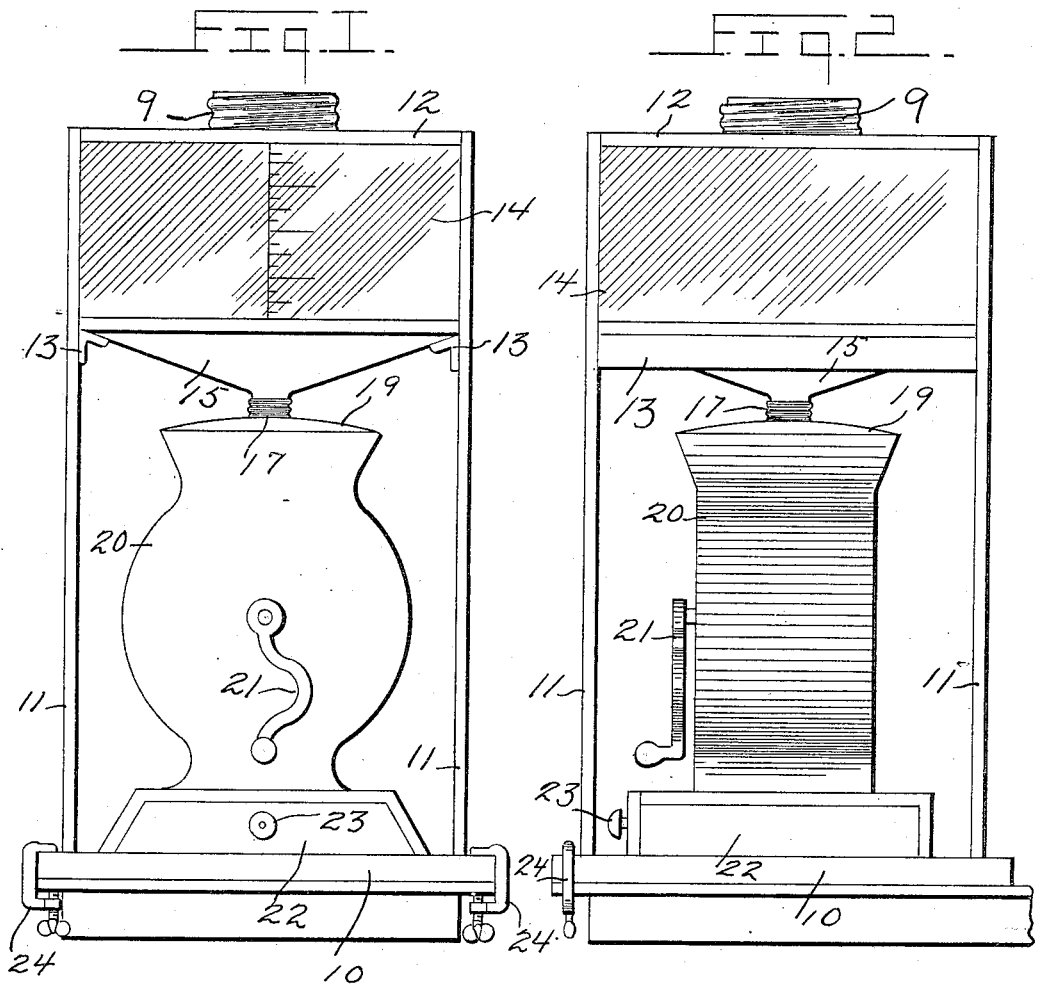
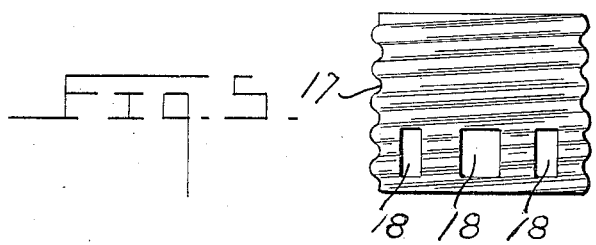
Witnesses
E. E. Johansen
E. L. Chandlee
Inventor
Ivan E. Brandrick
By Woodward & Chandlee
Attorney

I. E. BRANDRICK.
COFFEE GRINDER.
APPLICATION FILED MAY 28, 1909.

934,590.

Patented Sept. 21, 1909.
2 SHEETS—SHEET 2.

Witnesses
E. E. Johansen
E. L. Chandlee

Inventor
Ivan E. Brandrick.
By Woodward & Chandlee
Attorney

UNITED STATES PATENT OFFICE.

IVAN E. BRANDRICK, OF ARDSLEY, NEW YORK.

COFFEE-GRINDER.

934,590.

Specification of Letters Patent. Patented Sept. 21, 1909.

Application filed May 28, 1909. Serial No. 498,799.

*To all whom it may concern:*

Be it known that I, IVAN E. BRANDRICK, a citizen of the United States, residing at Ardsley, in the county of Westchester and State of New York, have invented certain new and useful Improvements in Coffee-Grinders, of which the following is a specification.

This invention relates to certain new and useful improvements in coffee canisters and mills.

The object of my invention is to provide a grinding mill for household purposes, constructed so that the coffee may be stored in a receptacle which is in direct and practically air-tight connection with a grinding mill, so that in the use of the mill the coffee will not deteriorate through evaporation.

A further object is, to provide a mill having a hopper arranged to be detachably secured to a mill, so that the mill or canister which forms the hopper, may be used independently.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

Figure 4:
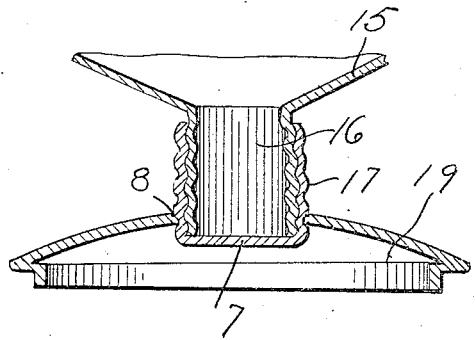
Figure 6:
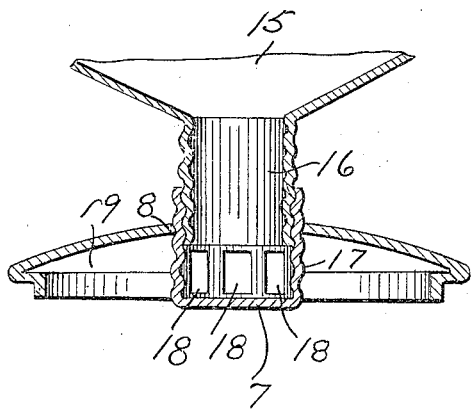
Figure 5:
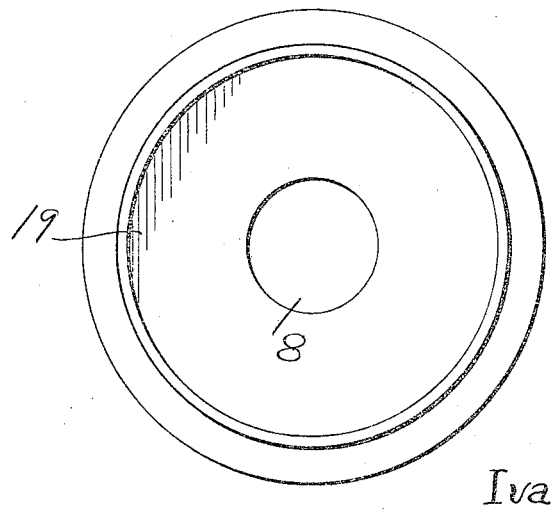

In the drawings forming a part of this specification, and in which like numerals of reference indicate similar parts in the several views, Figure 1 is a front elevation of the complete mill embodying my invention. Fig. 2 is a side elevation of the same. Fig. 3 is a bottom view of the mill lid. Fig. 4 is a transverse sectional view, through the cap. Fig. 5 shows a detached detail of the screw cap as used in my invention. Fig. 6 shows a central sectional view, disclosing the cap in its discharging position.

The aim of my invention is to provide a simply constructed coffee mill provided with a canister within which the unground coffee beans are held, and from which they may be fed into the grinding mill as required for use.

In the drawings, the numeral 10 designates a suitable base from which extends a supporting frame comprising the vertically held members 11 secured above by means of the transverse frame members 12. Intermediate of their ends the side members 11 are connected by means of the supporting cleats 13, these cleats being positioned near the upper end of the same. Secured to the base 10 is the grinding mill comprising the casing 20 having the usual operating crank 21 and within the bottom of this mill is a suitable drawer 22 provided with the operating button 23. The mill is of any approved type and construction.

To the top of the mill I secure a lid 19, having a centrally positioned threaded opening 8, this lid being arranged to tightly fit upon the grinding mill, as shown.

Held within the upper end of the supporting frame and supported by means of the cleats 13, is a coffee canister 14, having an inclined bottom 15, from which bottom is extended an exteriorly threaded neck 16, the top of the canister being closed by means of a suitable lid 9, as clearly shown in Fig. 1.

Threaded upon the neck 16 is a screw cap 17, having the lateral escape openings 18, as shown. The screw cap 17 is held in frictional engagement upon the threaded neck 16 of the canister. As shown, the screw cap has a solid bottom 7, so that when this cap is screwed upon the neck 16 its full limit, the bottom 7 closes the lower escape opening of the canister. As shown, the lower end of this threaded neck 16 ends proximal to and extends slightly into the opening 8 within the lid 19 of the mill, this threaded opening 8 being of such shape, size and diameter that the screw cap 17 carried upon the neck 16 will snugly screw and thread into this lid 19.

As shown, when the screw 17 is advanced upon the neck its full limit, the canister is closed. Now when a supply of coffee is required the operator advances the screw cap 17, so that the escape openings 18 become unclosed, so that the coffee beans can escape through these openings 18 and gravitate into the mill. The required number having been allowed to drop in the mill, the bottom of the coffee canister is again closed by means of this cap 17. The beans within the mill can then be conveniently ground, the ground coffee being collected within the drawer 22. By this means I provide practically an air-tight connection between the canister and mill.

Where the canister 14 is made of glass, suitable graduations may be placed upon the outside so that the operator can determine accurately the quantity of coffee beans entering the mill. So also as the end 19 screws upon the cap 17, when it is desired to remove the mill, the lid 18 can simply be threaded upward upon the cap 17.

The base 10 may be secured to a table or other suitable support by means of the clamps 24.

The device forms a neat, efficient and readily operated mill.

And having thus described my said invention, what I claim as new and desire to secure by United States Letters Patent is:

1. The combination, a base, a supporting frame secured to said base, a grinding mill secured to said base, supporting cleats secured to said frame above said mill, a lid closing said mill having a centrally positioned threaded opening, a canister held by said cleats having an inclined bottom ending in an exteriorly threaded neck held proximal to said lid opening, and a screw cap having side escape openings threading upon said neck and into said lid opening, as and for the purpose set forth.

2. The combination with a canister or hopper having an exteriorly threaded discharge neck, of a mill having a lid provided with a centrally positioned threaded opening, and a cap having escape openings threading upon the said exteriorly threaded discharge neck, as and for the purpose set forth.

In testimony whereof I affix my signature, in presence of two witnesses.

IVAN E. BRANDRICK.

Witnesses:
LORENZO D. QUIMBY,
AUGUSTUS TRAVIS.